United States Patent [19]
Takada

[11] Patent Number: 5,330,693
[45] Date of Patent: Jul. 19, 1994

[54] PROCESS AND APPARATUS FOR INJECTION-MOLDING PRODUCT HAVING MINUTE SURFACE PATTERN AND CENTRAL HOLE

[75] Inventor: Kunio Takada, Kawasaki, Japan

[73] Assignee: Canon Kabushiki Kaisha, Tokyo, Japan

[21] Appl. No.: 761,284

[22] Filed: Sep. 17, 1991

[30] Foreign Application Priority Data

Sep. 18, 1990 [JP] Japan .................................. 246270

[51] Int. Cl.$^5$ ............................................ B29C 45/38
[52] U.S. Cl. ........................................ 264/106; 264/154; 264/161; 264/163; 264/334; 425/553; 425/557; 425/577; 425/810
[58] Field of Search ............... 264/106, 334, 335, 336, 264/154, 161, 163; 425/553, 554, 556, 566, 571, 577, 437, 438, 444, 810

[56] References Cited

U.S. PATENT DOCUMENTS

| | | | |
|---|---|---|---|
| 4,466,934 | 8/1984 | Cane et al. ......................... | 264/106 |
| 4,715,806 | 12/1987 | Ehrler et al. ....................... | 425/810 |
| 4,772,196 | 9/1988 | Asai ................................... | 425/810 |
| 5,018,962 | 5/1991 | Kitamura et al. .................. | 425/810 |
| 5,068,065 | 11/1991 | Maus et al. ........................ | 425/554 |
| 5,092,758 | 3/1992 | Tanaka et al. ..................... | 425/810 |
| 5,106,553 | 4/1992 | Onisawa et al. ................... | 425/810 |

FOREIGN PATENT DOCUMENTS 1264816 10/1989 Japan .
2243317 9/1990 Japan .

Primary Examiner—Jill L. Heitbrink
Attorney, Agent, or Firm—Fitzpatrick, Cella, Harper & Scinto

[57] ABSTRACT

A product, such as an optical disk substrate, having a minute surface pattern and a central hole is suitably obtained by an injection molding, wherein a resin is injected into a cavity defined by a mold including a movable half and a fixed half. The movable half is provided with an ejector ring reciprocally movable in a mold opening-and-closing direction and a gate cutter reciprocally movable at two strokes in the mold opening-and-closing direction. After the resin is injected into the cavity to form a product accompanied with a gate, the gate cutter is moved at a first stroke to cut the gate. Then the mold is opened, and substantially simultaneously with commencement of the mold opening, the product is released from the stamper and the gate cutter is moved at a second stage stroke in a direction causing the release of the product from the stamper.

58 Claims, 13 Drawing Sheets

PROCESS AND APPARATUS FOR INJECTION-MOLDING PRODUCT HAVING MINUTE SURFACE PATTERN AND CENTRAL HOLE

FIELD OF THE INVENTION AND RELATED ART

The present invention relates to an injection molding process and an injection molding apparatus for producing a shaped product or part, such as a substrate for an optical disk or an opto-magnetic disk, having a minute surface pattern and a central hole.

A substrate for a high-density data recording medium, such as an optical disk or a video disk, having a minute pattern of a micron order or a sub-micron order, such as tracking grooves or pre-pits, and also a central hole, has been conventionally prepared by injection molding using a system (apparatus and process) as illustrated in FIGS. 7–11. Referring to FIG. 7, the apparatus includes a fixed half (of mold) comprising a fixed plate 71 and a fixed mirror 72 affixed to the fixed plate 71, and a movable half (of mold) comprising a movable plate 73 and a movable mirror 74 affixed to the movable plate 73. To the surface of the movable mirror 74 is affixed a stamper 75 for forming a minute preformat, such as data pits, tracking pits and tracking grooves, on an optical disk substrate held by an outer (peripheral) stamper holder 76 and an inner (peripheral) stamper holder 77. When the movable half and the fixed half are closed with each other as shown in FIG. 8, a cavity 83 is formed by the fixed mirror 72 and the movable mirror 74, and a resin melted under heating in an injection cylinder is injected into the cavity 83 through a nozzle 78 and a sprue hole defined by a sprue bush 79 to fill the cavity 83.

Then, as shown in FIG. 9, a gate cutter 81 is sent forward to cut a gate part 84 of the resin filling the cavity. Then, a substrate (shaped resin) in the cavity is first released from the fixed mirror 72 by moving the movable half (as shown in FIG. 10), and thereon released from the stamper 75 by forward drive of ejectors 80–82 to form an optical disk substrate 85 having a transferred preformat on the surface and a central hole as shown in FIG. 11.

In the conventional process described above, the mold is opened while the shaped substrate and the stamper are in intimate contact with each other, and the substrate at this time is released from the compression of the mold and simultaneously exposed to the atmospheric air at room temperature to be rapidly cooled, thus causing a thermal shrinkage radially inwardly. For example, in the case of forming a disk substrate of polycarbonate resin, the movable half and the fixed half are held at around 100° C., and it is known that the substrate exposed to the air by mold opening causes as large a shrinkage as about 4 microns for a disk substrate with a diameter of 130 mm. On the other hand, the stamper does not cause a rapid decrease in temperature because it is in intimate contact with the substrate, so that a difference in degree of shrinkage occurs between the substrate and the stamper. As a result, the substrate shrinks radially inwardly while its interface with the stamper (data transfer face) is in contact with the unevenness pattern on the stamper surface, so that pits are deformed on the substrate 805 due to flow marks 805a caused by impairment with convexities on the stamper as shown in FIG. 12. This phenomenon is called "flowing". For this reason, it has been difficult to transfer a preformat at high accuracy.

In order to solve the above problem, Japanese Laid-Open Patent Application (JP-A) 264816/1989 has proposed a method wherein, when an optical disk substrate is released after injection molding using a mold as shown in FIG. 7, air is discharged from air ejectors (not shown) respectively provided in the fixed half 71 and the movable half 73 simultaneously with the commencement of mold opening so that the stamper-side face of the substrate 805 is released earlier than or simultaneously with the release of the opposite face (hereinafter called a "preceding release method"). Thus, the shrinkage of the substrate is caused when the substrate is apart from the stamper, so as to prevent the "flowing". This method is however accompanied with a problem as described below.

In order to uniformly release the entire face of an optical disk substrate, it is required to discharge a high-pressure air of 3–7 kg/cm$^2$, whereby the optical disk substrate is frequently blown to the fixed half side or overly floated from the movable half. As a result, at the time of removing the optical disk substrate out of the mold, it is impossible to obtain a constant positional relationship between the optical disk substrate and an artificial hand of a removing mechanism, so that there frequently occur problems, such as collision of the hand of the removing mechanism with the substrate and a chuck failure, i.e., a failure in securely holding the substrate by the hand, leading to interruption of the molding operation and thus a failure in stable molding of the substrates.

JP-A 243317/1990 also discloses several injection molding apparatus for performing the preceding release including, e.g., one wherein a disk substrate is held by a fixed half by suction from the fixed half at the time of mold opening and then released from the fixed half for removal out of the mold. In this case, however, the data transfer face of the disk substrate is held by the hand of a removing mechanism. This is disadvantageous for a disk substrate which causes an error due to even small damage at pits.

SUMMARY OF THE INVENTION

In view of the above-mentioned problems of the prior art, an object of the present invention is to provide a system (apparatus and process) for injection molding of a product having a minute surface pattern and also a central hole, which system allows a high accuracy transfer of a minute pattern and a stable molding by securely holding the molded product on the side of a movable half.

Another object of the present invention is to provide a system for injection molding of a disk substrate having a central hole allowing a high accuracy transfer of a minute preformat pattern and a stable molding.

A further object of the present invention is to provide a disk substrate free from warp or surface fluctuation and with minimum birefringence.

According to an aspect of the present invention, there is provided an apparatus for injection molding of a product having a minute surface pattern and a central hole, comprising a mold including a movable half provided with a stamper having a minute surface pattern and a fixed half forming a cavity to be filled with a resin in combination with the movable half, wherein the movable half is provided with an ejector ring reciprocally movable in a mold opening-and-closing direction and a gate cutter reciprocally movable at two stages of strokes in the mold opening-and-closing direction.

According to another aspect of the present invention, there is provided a process for injection molding of a product having a minute surface pattern and a central hole, comprising injecting a resin into a cavity defined by a mold including a movable half provided with a minute surface pattern and a fixed half defining the cavity in combination with the movable half, wherein the movable half is provided with an ejector ring reciprocally movable in a mold opening-and-closing direction and a gate cutter reciprocally movable at two stages of strokes in the mold opening-and-closing direction, after the resin is injected into the cavity to form a product accompanied with a gate, the gate cutter is moved at a first stroke to cut the gate, then the mold is opened, and substantially simultaneously with commencement of the mold opening, the product is released from the stamper and the gate cutter is moved at a second stage stroke in a direction causing the release of the product from the stamper.

According to the present invention, there is also provided a disk substrate produced by the operation of the above-mentioned injection molding system (apparatus and process).

Thus, in the system according to the present invention, the molded product is released from the stamper substantially simultaneously with the commencement of mold opening, and the gate cutter holding an inner peripheral edge adjacent to the central hole of the product is ejected or projected in a direction to release the product from the stamper, thus holding the product on the movable half side even according to a preceding release scheme. Accordingly, it is possible to always retain a constant positional relationship between the product and a hand of a removing mechanism for removing products out of the mold, thus allowing a stable molding without causing a chuck failure.

These and other objects, features and advantages of the present invention will become more apparent upon a consideration of the following description of the preferred embodiments of the present invention taken in conjunction with the accompanying drawings, wherein like reference numerals denote like parts.

DESCRIPTION OF THE PREFERRED EMBODIMENTS

Figure 1:
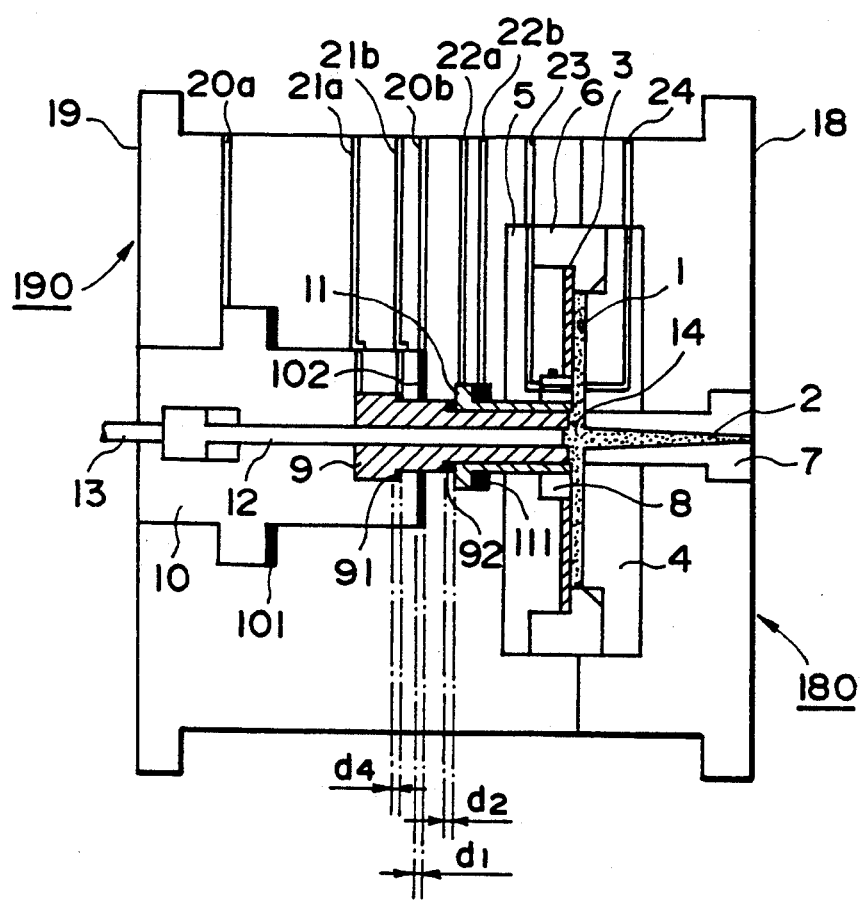
FIGS. 1-4 are schematic sectional views of an embodiment of the injection molding apparatus according to the present invention illustrating various operational stages thereof.

FIGS. 1-4 are schematic sectional views for illustration of a system (apparatus and process) for injection molding of an optical disk substrate according to the present invention.

Referring to FIGS. 1-4, the apparatus includes a fixed half (of mold) 180 comprising a fixed plate 18 and a fixed mirror 4 affixed to the fixed plate 18. The fixed half is provided with a sprue bush 7 defining a sprue (hole) 2 leading to a cavity at its inner end.

On the other hand, the mold further includes a movable half 190 comprising a movable plate 19 and a movable mirror 5 affixed to the movable plate. The movable half 190 is further provided with a drive ram 10, a gate cutter 9 reciprocated by the drive ram 10 in the same direction as the opening and closing of the mold, and an ejector ring 11 fitted with the gate cutter 10 so as to be slidable therewith in the same direction. An ejector pin 12 is fitted slidably through a bore formed concentrically with the drive ram 10 and the gate cutter 9 and is reciprocated by an ejector rod 13 which in turn is reciprocated in the axial direction (the direction of mold opening and closing) by a drive means (not shown).

The movable mirror 5 is affixed to a face of the movable plate 19 confronting the fixed plate 18, and to the surface thereof is affixed a stamper 3 inscribed with grooves and pits forming a minute pattern of a micron order held by an inner stamper holder 8 at its center and an outer peripheral ring 10.

The drive ram 6 is fitted with clearances 101 and 102 in the movable half and is reciprocated with a stroke $d_1$ under the action of a pressurized fluid such as compressed air supplied selectively through conduits 20a and 20b so as to reciprocate the gate cutter 9 with a stroke $d_1$ which is a first stage stroke.

The gate cutter 9 has a front part having a diameter identical to that of the central hole of the product 1, an intermediate part having a larger diameter than the front part and a rear part having a further larger diameter. The rear part is inserted into a cylinder recess of the drive ram 10 and is reciprocated with a stroke of $d_4$ (a second stage stroke) independently of the drive ram 10 under the action of a pressurized fluid supplied selectively through conduits 21a and 21b, a clearance 91 disposed in the cylinder and a clearance 92 disposed in the movable half. Due to the second stage stroke of the gate cutter 9, a flange between the front and intermediate parts is abutted against an ejector ring 11 so as to project the gate cutter 9 and the ejector ring 11 together in a direction to cause the product 1 to peel from the stamper.

Further, the ejector ring 11 is disposed so as to be reciprocally movable with a stroke $d_6$ (FIG. 3) independently of the gate cutter 9 due to the presence of a clearance 111 in the movable half and under the action of a pressurized fluid supplied selectively through conduits 22a and 22b.

There are further disposed passages 23 and 24 for a pressurized release fluid for releasing the product in the movable half and the fixed half, respectively.

Now, a process for injection molding of an optical disk substrate (hereinafter referred to as a "product 1") by using the above-mentioned injection molding apparatus according to the present invention, will be described.

FIG. 1 illustrates a state when the fixed half 180 and the movable half 190 are closed with each other to define a cavity, which is filled with a melted resin to complete a stage of injection filling a product.

As shown, the drive ram 10, gate cutter 9, ejector ring 9 and ejector pin 12 are all set back to the leftmost retracted position.

Figure 2:
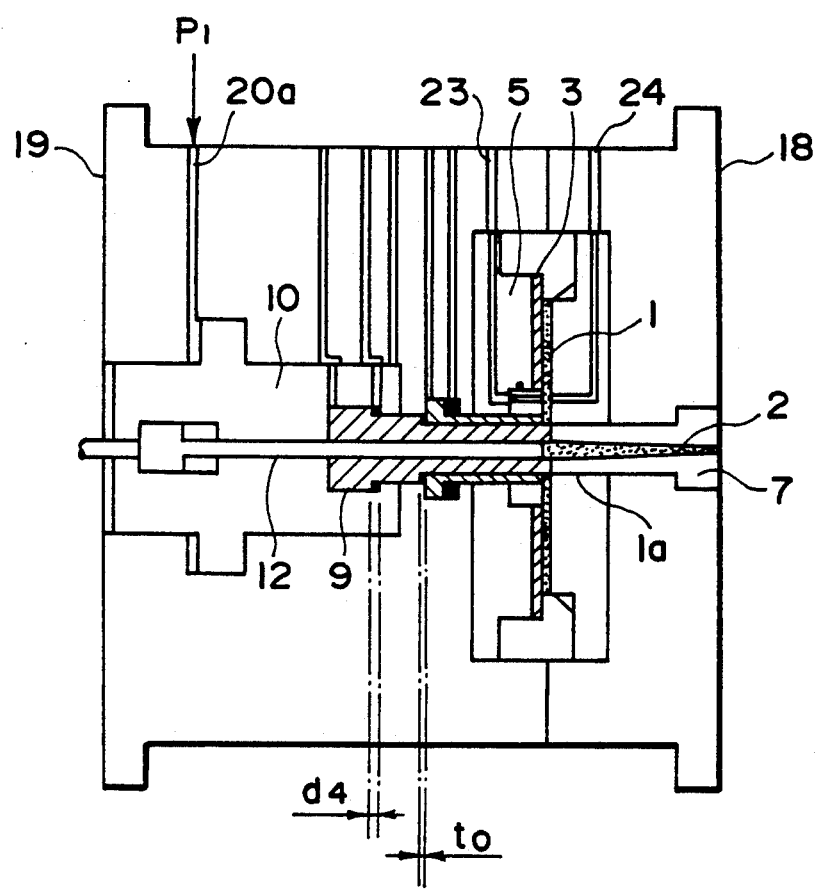

After the completion of injection filling of the product 1, a shown in FIG. 2, a pressurized fluid is supplied through the conduit 20a to apply a first drive pressure $P_1$ to move the drive ram 10 rightward (referred to as "forward"), thereby to move the gate cutter 9 with a first stage stroke $d_1$, whereby the gate 14 is cut to form a central hole 1a and the product 1 is held by the circumference of the gate cutter 9 tip at its inner peripheral face of the central hole.

The drive ram 10 may be driven after or before the product 1 in the cavity solidifies but, if the drive ram 10 is driven to form the central hole 1a before the solidification, distortion, deformation or minute cracks are not readily formed at a part of the product 1 in the vicinity of the central hole and also the wearing of the gate cutter 9 is minimized.

The first stage stroke $d_1$ of the gate cutter 9 is set so as to form a central hole in the product 1 and may be ordinarily set to the thickness of the substrate, e.g., preferably 1.15 mm–1.25 mm for a 1.2 mm-thick disk substrate.

Figure 5:
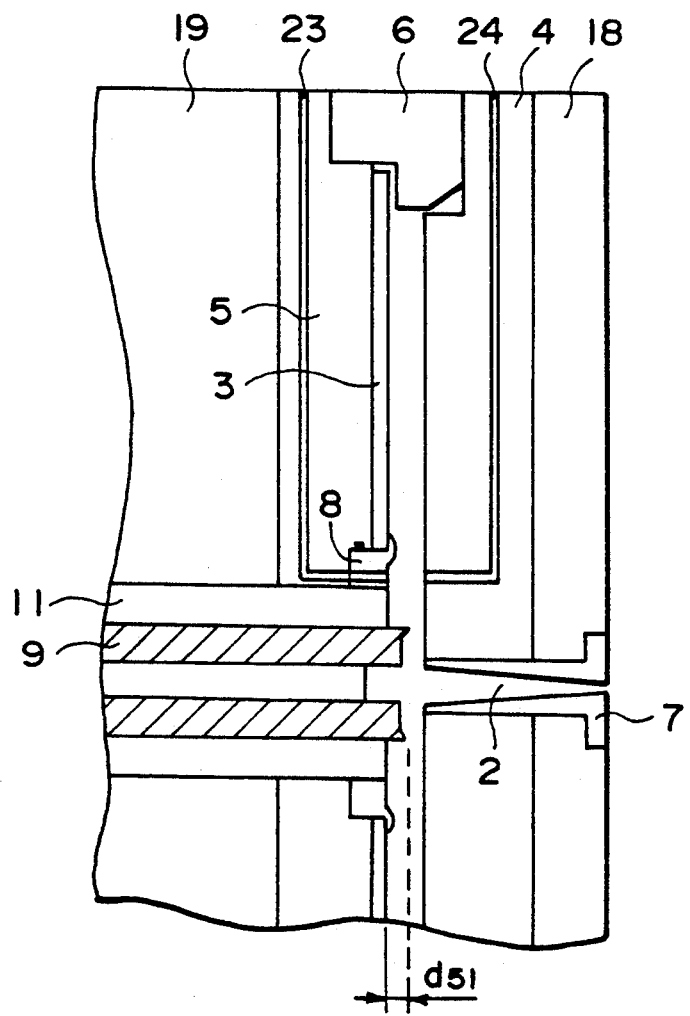
FIG. 5 is an enlarged sectional view of the embodiment.

Incidentally, in the present invention, the mold (movable half thereof) can be constructed so that the gate cutter 9 projects in advance by $d_{51}$ into the cavity to improve the positional accuracy of the central hole in the product 1 as shown in FIG. 5. In this instance, the preliminary projection $d_{51}$ should preferably be set to a value not hindering the filling up to the remote end of the cavity with a resin supplied through a sprue hole 2, e.g., about 15–75%, particularly 62.5–71%, of the whole thickness of the cavity. More specifically, the projection $d_{51}$ may preferably be 0.2–0.9 mm, particularly 0.75–0.85 mm, e.g., for a 1.2 mm-thick disk substrate. In this case, the first stage stroke $d_1$ of the gate cutter 9 is set to a value obtained by subtracting the value $d_{51}$ from the cavity thickness. For example, in the case where the cavity thickness is 1.2 mm and $d_{51}=0.8$ mm, the stroke $d_1$ may preferably be set to 0.4 mm±0.05 mm.

Further, it is preferred that, when the drive ram 10 is moved forward with the stroke $d_1$, a minimum value required for cutting the gate 14, the gate cutter 9 does not contact the ejector ring 11 but a gap corresponding to a stroke $t_0$ is left therebetween. More specifically, the value $d_2$ of the clearance 92 may preferably be set to satisfy the following formula (1):

$$d_2 = d_1 + t_0 \quad (1).$$

In this instance, if $t_0$ is set to 0–20 microns, particularly 10–20 microns, for a 1.2 mm-thick disk substrate (product), the product 1 can be securely ejected by the ejector ring 11 without premature drive of the ejector ring 11 at the first stroke drive of the gate cutter 9 or application of undue stress to the product due to the operation of the ejector ring during the closure of the mold.

Figure 3:
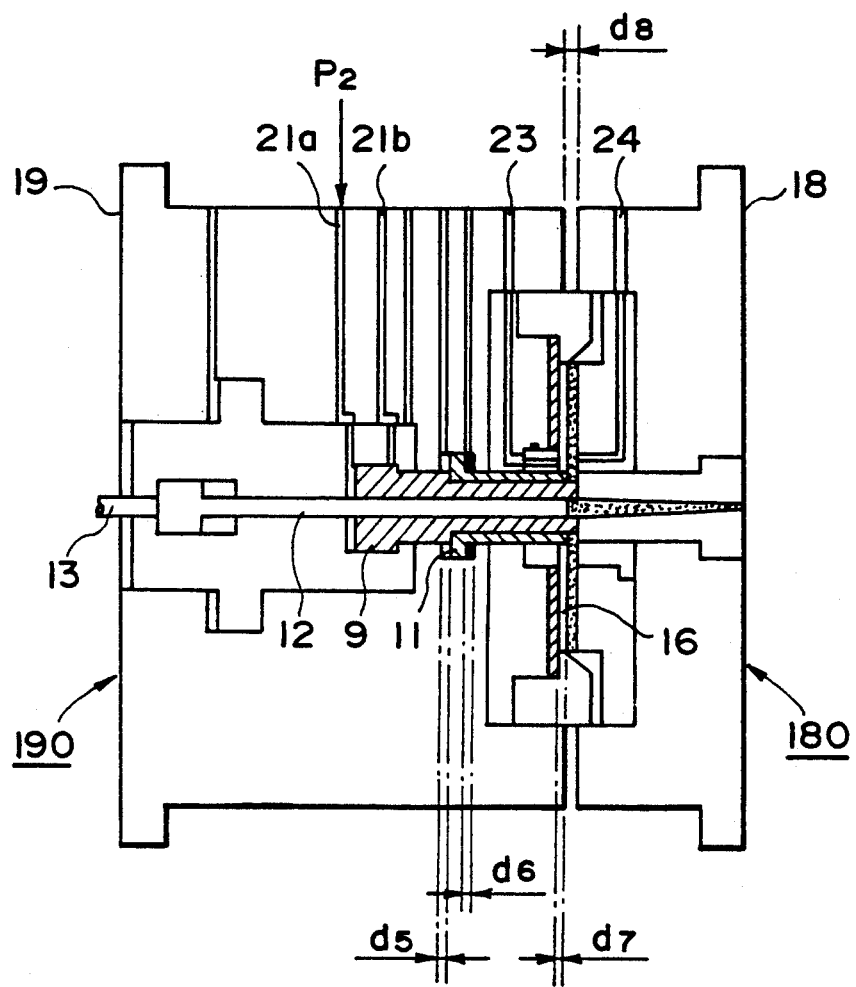

Then, as shown in FIG. 3, when the movable half 190 is moved backward to open the mold, a pressurized fluid is supplied through the conduit 21a to apply a second drive pressure $P_2$ to the gate cutter 9. As a result, the gate cutter 9 is forced to further move forward in association with the mold opening in addition to the forward stroke $d_1$ caused under the application of the first drive pressure $P_1$ and is abutted to the ejector ring 11 to cause the ring 11 to move forward. As a result, the product 1 is pushed by the ejector ring 11 to start to be released from the stamper and simultaneously therewith the sprue 2 is ejected by the gate cutter 9. In this instance, the forward movement of the gate cutter 9 and the forward movement of the ejector ring 11 are caused with a time difference corresponding to the gap $t_0$. Such a time difference is so small that the movements of the gate cutter 9 and the ejector ring 11 are regarded as substantially simultaneous herein.

If a release fluid is injected through the passage 23 in the movable half at the time of mold opening in addition to the above, the release of the product 1 from the stamper 3 is further ensured. The release fluid may be air, $N_2$ or another inert gas. The pressure of the release fluid may preferably be 0.5–7.0 Kg/cm$^2$, particularly 3.0–5.0 Kg/cm$^2$.

In the injection molding system according to the present invention, the gate cutter 9 holding the product at its front end is moved forward in association with the mold opening, so that it is unnecessary to remove the linkage between the gate cutter 9 and the product 1 when the product 1 is released from the stamper 3. As a result, even in the case where a high-pressure release fluid as described above is used, the product 1 is prevented from dropping apart from the movable half 190. Thus, the product is always held by the movable half so that a stable molding is possible. Further, as the product is released from the stamper simultaneously with the mold opening, flowing on the data transfer face of the product is prevented to allow a pattern transfer at a high accuracy.

Then, as the mold opening is proceeded, the spacing $d_3$ between the stamper 3 surface and the data transfer face of the product 1 is gradually enlarged until the relative movement of the product 1 with respect to the movable half 190 is terminated at the time of $d_7 \div d_4$, wherein $d_4$ is a second stage stroke of the gate cutter 9.

In the present invention, the second stage stroke $d_4$ should preferably be set to a value such that the data transfer face of the product and the unevenness pattern on the stamper do not contact each other, more specifically a value within the range of 50 microns to 4 mm.

Figure 6A:
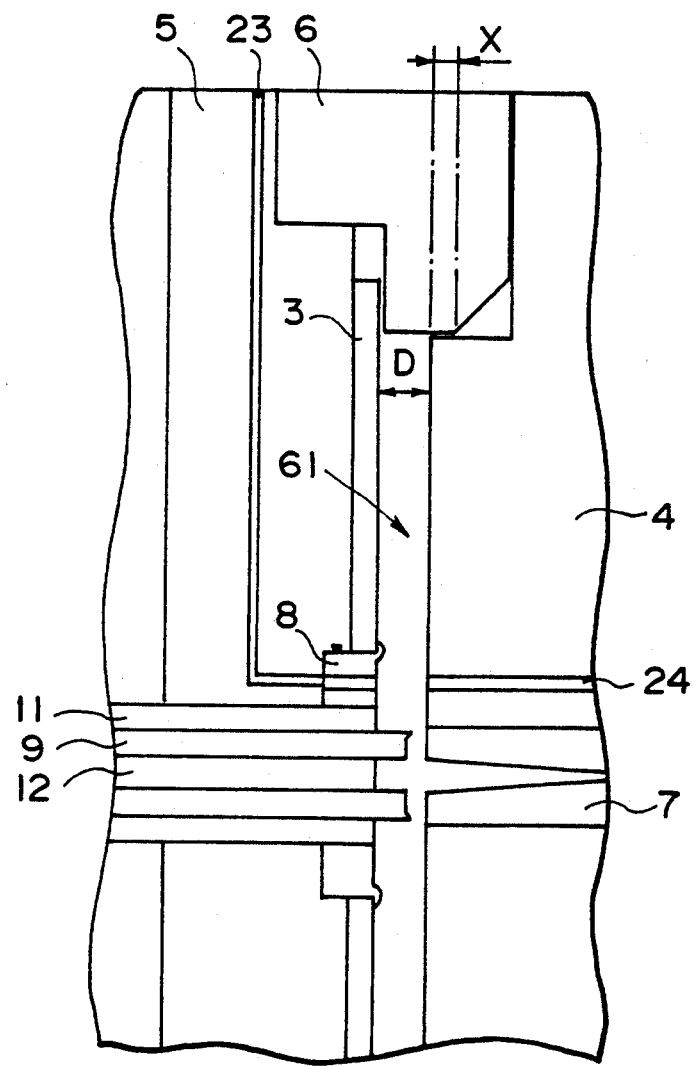
FIGS. 6A and 6B are partial enlarged illustrations of the embodiment for explaining the operation.
Figure 6B:
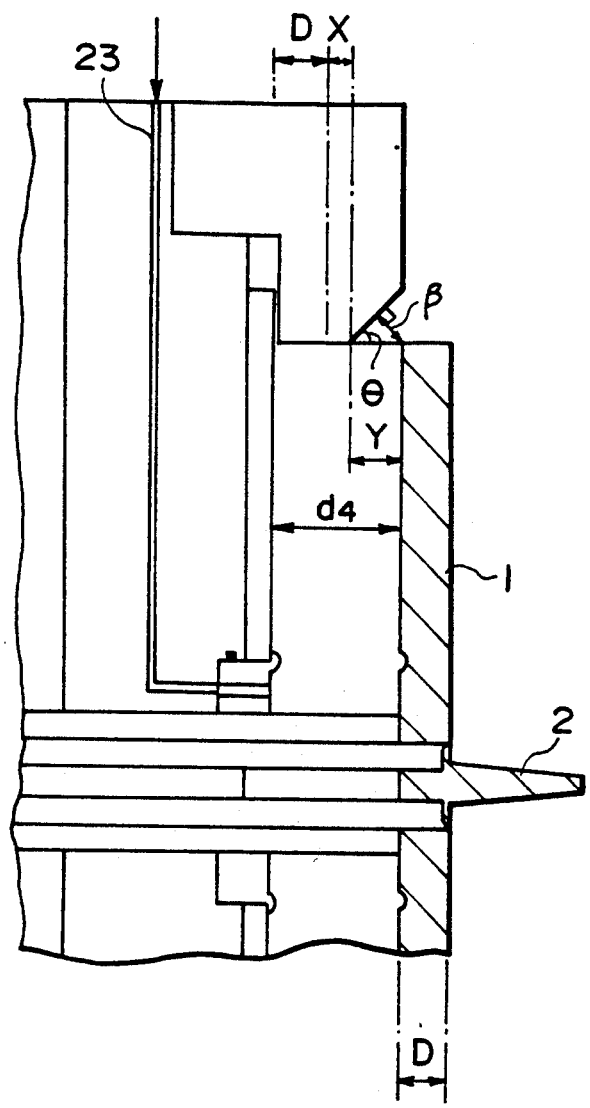
Figure 7:
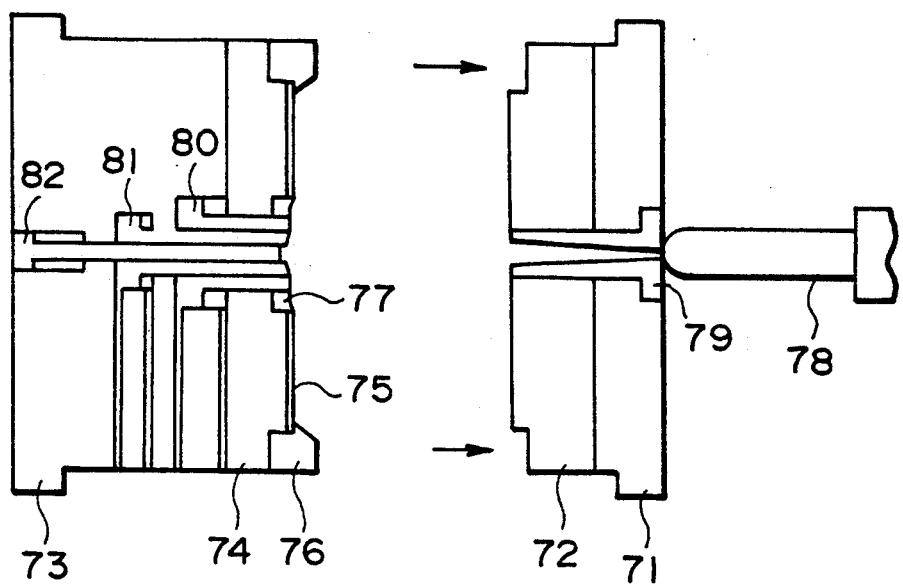
FIGS. 7-11 are schematic sectional views of a conventional injection molding apparatus for illustrating various stages of operation thereof.
Figure 8:
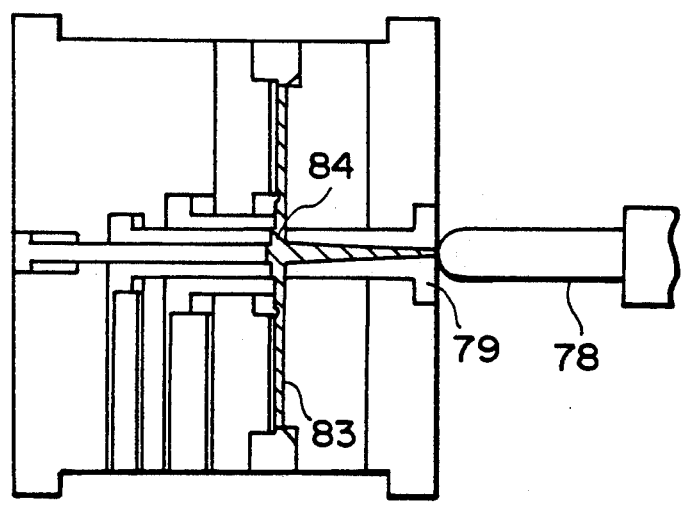
Figure 9:
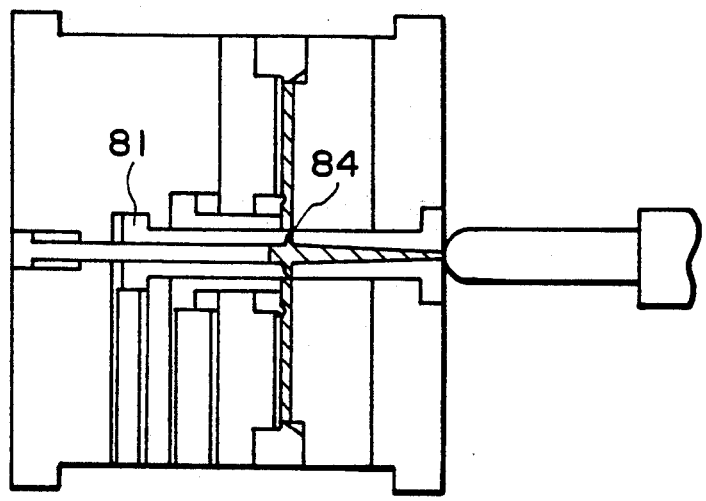
Figure 10:
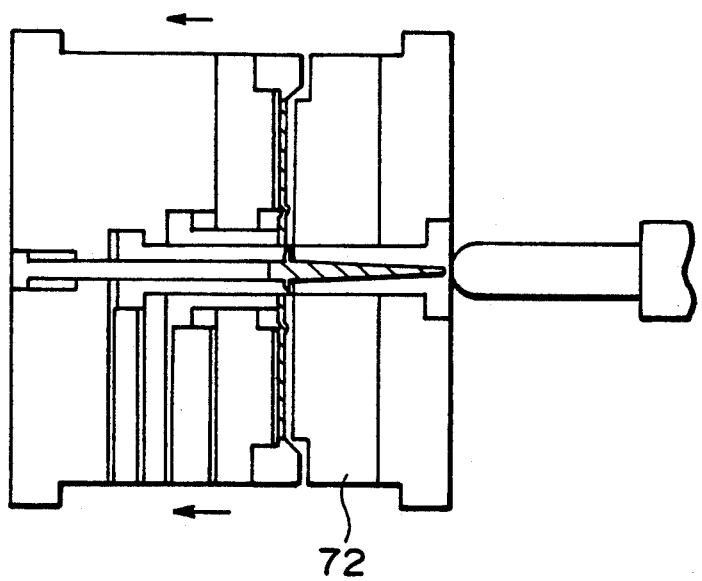
Figure 11:
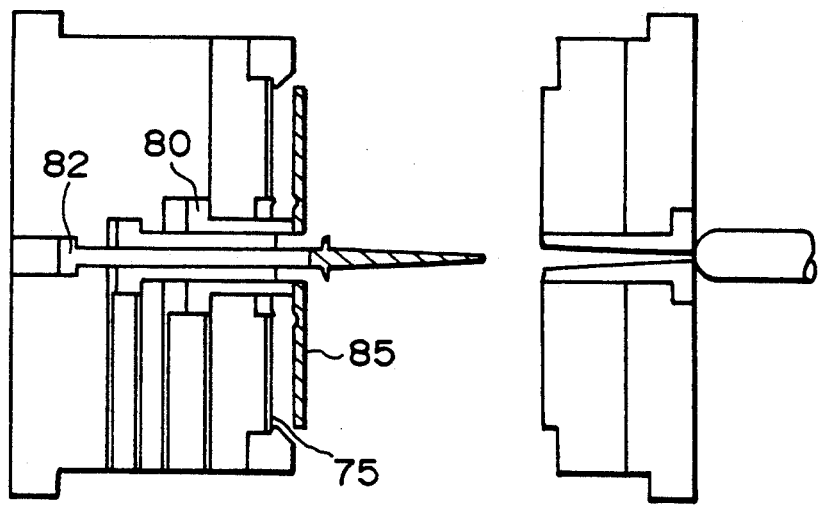
Figure 12:
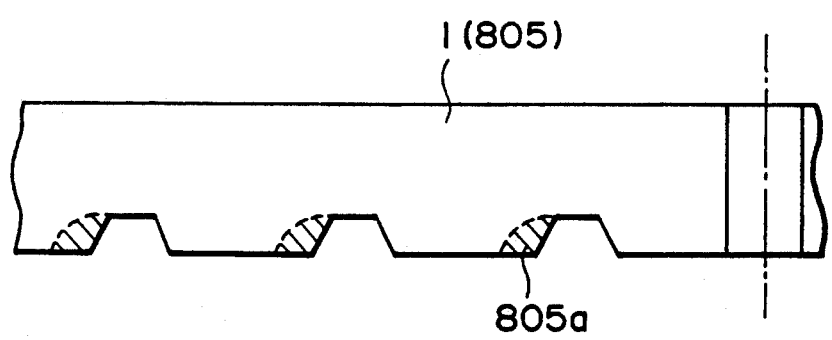
FIG. 12 is an enlarged sectional view of a disk substrate obtained by the conventional injection molding system.

In a preferred embodiment using a release fluid supplied through the movable half at the time of the mold opening as shown in FIG. 1 or FIG. 6A which is an enlarged partial view of FIG. 1, the outer (peripheral) ring 6 used for affixing the stamper 3 to the movable mirror 5 by holding the outer periphery of the stamper 3 may be constituted to provide a part of the inner surface defining the cavity 61 and to have a tapered face providing an inner diameter which is enlarged as it goes in the forward direction, and the fixed mirror 4 may be fitted against the outer stamper-holding ring 6. In this embodiment, if the second stage stroke $d_4$ is set so as to provide a gap $\beta$ for liberating the release fluid supplied through the movable half between the edge of the data transfer face of the product 1 and the tapered face of the stamper holder ring 6 at the time of release, it is possible to prevent fluctuation of the product due to discharge of the release fluid and also occurrence of warp or tilt of the product thereby. In this instance, if the angle of the taper is represented by $\theta$, the width of the portion (land)

where the outer ring 6 and the fixed mirror 4 overlap each other at the time of mold closing is represented by X, the cavity thickness is represented by D, and the distance between the front end of the inner periphery land of the outer ring 6 and the data transfer face of the product 1 at the time of the release is represented by Y as shown in FIGS. 6A and 6B, the second stage stroke $d_4$ is represented by the following formula (2):

$$d_4 = D + X + Y = D + X + \beta/\sin\theta \quad (2).$$

In this instance, the gap $\beta$ may preferably be 50–300 microns, particularly 80–120 microns, so as to effectively suppress the warp occurring in the product while it can depend on the pressure and amount of the release fluid supplied through the movable half 190.

Accordingly, the stroke $d_4$ (micron) may preferably be set to a value within the range of $D+X+50/\sin\theta$ to $D+X+300/\sin\theta$, particularly $D+X+80/\sin\theta$ to $D+X+120/\sin\theta$. For example, in case where the taper angle $\theta$ is 5 degrees, the cavity (product) thickness $D=1.2$ mm and the land width X is 0.2 mm, if $d_4$ is set to a value within the range of 2.32 mm to 2.80 mm, it is possible to suppress the occurrence of a warp or tilt of the product 1 even when the release fluid is supplied through the movable half at the time of mold opening.

Further, if a release fluid is also supplied through a passage 24 in the fixed half 180 in the mold opening step, it is possible to further ensure the release of the product 1 from the fixed mirror 4. The pressure of the release fluid may preferably be 0.5–5.0 Kg/cm$^2$ particularly 0.5–2.0 Kg/cm$^2$. In case where the release fluid is ejected from the movable half, the release fluid from the fixed half may preferably be ejected before the movement of the product 1 relative to the movable half is terminated, particularly simultaneously with the mold opening so as to prevent the occurrence of crape-like wrinkles on the face opposite to the data transfer face of the product 1. In this case wherein the release fluid is ejected from both the movable half and the fixed half, the release fluid from the fixed half may preferably have a pressure equal to or smaller than that of the release fluid supplied from the movable half.

Figure 4:
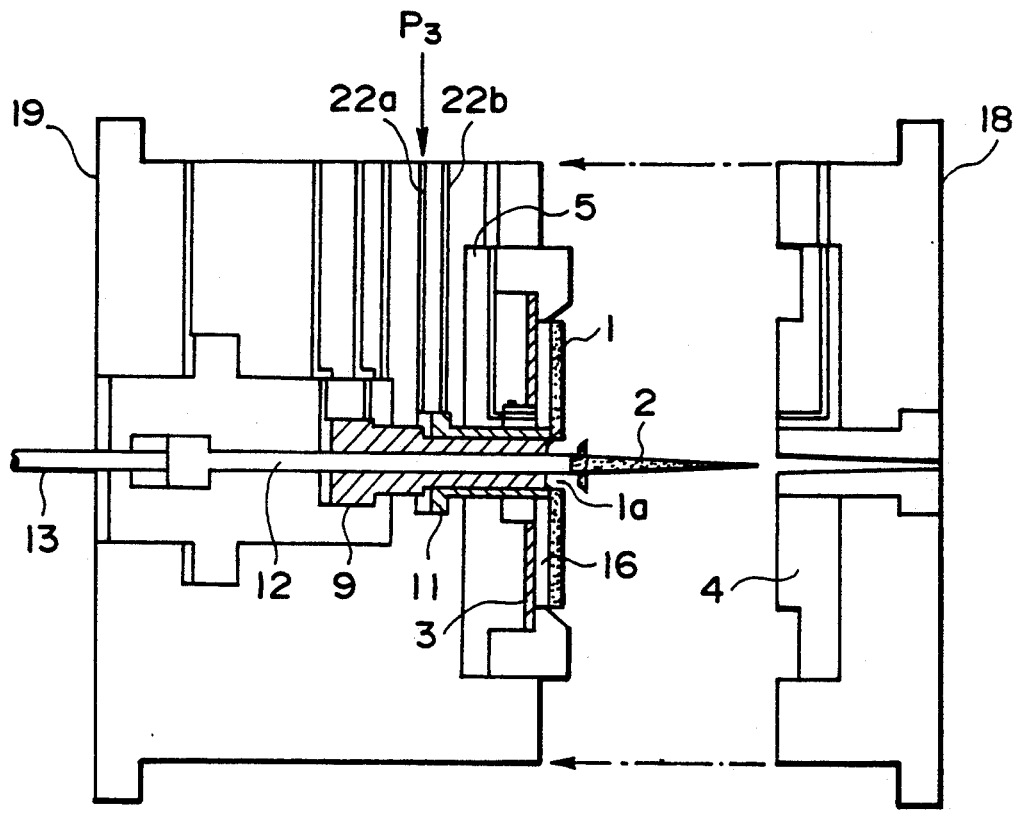

Then, as shown in FIG. 4, both halves are further opened from each other to complete the mold opening, and finally the product 1 is removed. More specifically, the ejector ring 11 caused to project toward the fixed half can be further moved by a stroke $d_6$ under the action of a third drive pressure $P_3$ by supplying a pressurized fluid through a conduit 22a. Accordingly, the ejector pin 12 is moved forward to further project the sprue 2, which is then removed. Then, when both halves are fully open from each other and at an instant that a hand of a removing mechanism (not shown) is to just hold the product, the ejector ring 11 is further moved forward by the stroke $d_6$ under the action of the third drive pressure $P_3$ to deliver the product 1 to the hand, thus completing one molding cycle.

The stroke $d_6$ may be set to a value sufficient to release the linkage between the gate cutter 9 and the product 1, preferably 1.2 mm–3.0 mm, e.g., for a 1.2 mm-thick substrate.

Figure 13:
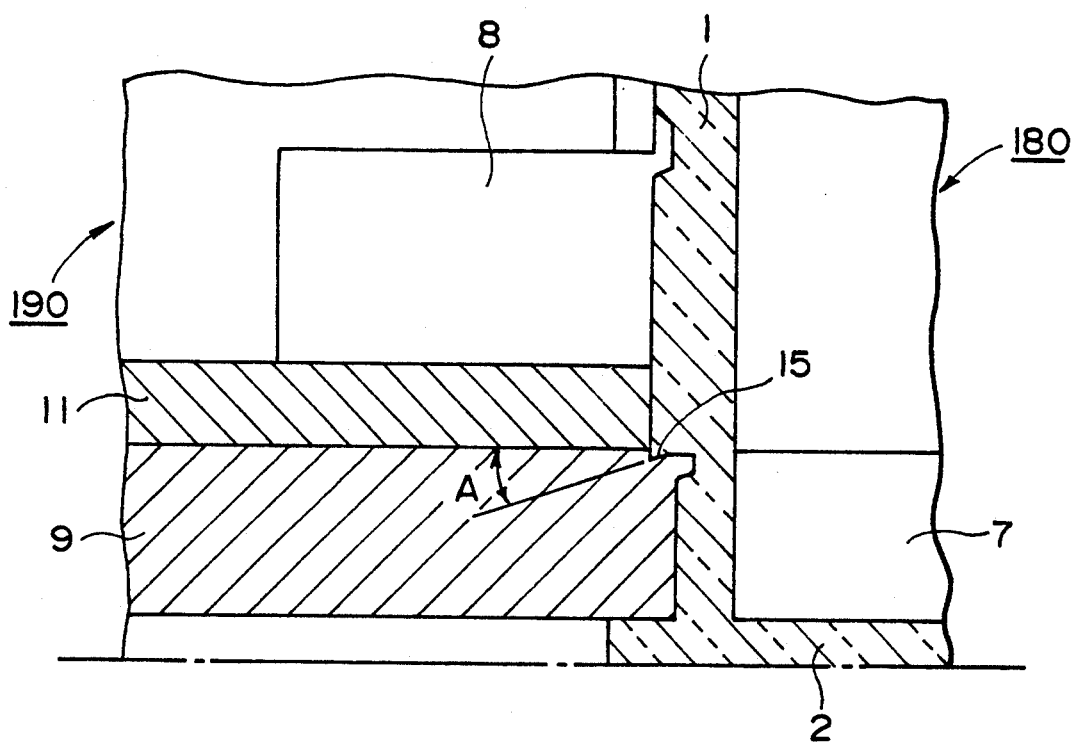
FIG. 13 is an enlarged view of the tip of a gate cutter.

In a preferred embodiment, an undercut 15 may be formed at a circumferential part near the tip of the gate cutter 9 as shown in FIG. 13. As a result, the gate cutter is allowed to securely cut into the inner central part of the product so that the product is prevented from being removed together with the fixed half at the time of the mold opening and prevented from dropping from the movable half, thus providing a further improved molding stability.

The undercut 15 shown in FIG. 13, may have a shape of a tapered cutting from the circumference toward the centers of the gate cutter 9 having a taper angle A of 2degrees–3 degrees.

Figure 14:
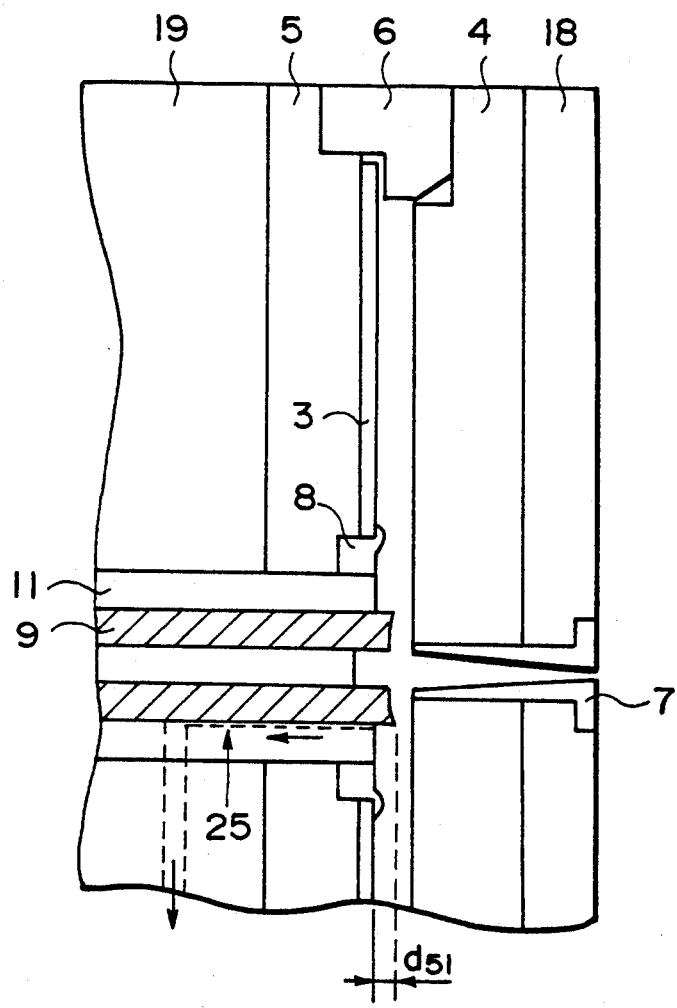
FIGS. 14 and 15 are schematic sectional views of another embodiment of the injection molding apparatus according to the present invention.

In addition to or instead of the undercut 15 as a means for holding the product 1, it is possible to dispose a suction hole 25 by utilizing a gap between the gate cutter 9 and the ejector ring 11 as shown in FIG. 14 so as to prevent the dropping of the product 1 at the time of the mold opening by sucking through the vacuum suction hole.

In the above embodiment, the gate cutter 9 is moved with a first stage stroke $d_1$ by means of the drive ram 10, and the second stage stroke of the gate cutter 9 and the simultaneous movement of the ejector ring 11 so as to move the product in a direction of peeling from the stamper are performed by a mechanism where the gate cutter 9 is abutted to the ejector ring for projection so as to release the product 1 from the stamper 3. Instead of the above, however, it is possible to provide separate drive means for independently driving the gate cutter 9 and the ejector ring 11 so as to strictly control their strokes. Particularly, it is preferred that the drive stroke of the ejector ring 11 for releasing the product 1 from the stamper simultaneous with the commencement of the mold opening do not exceed the second stage stroke $d_4$ of the gate cutter 9.

Figure 15:
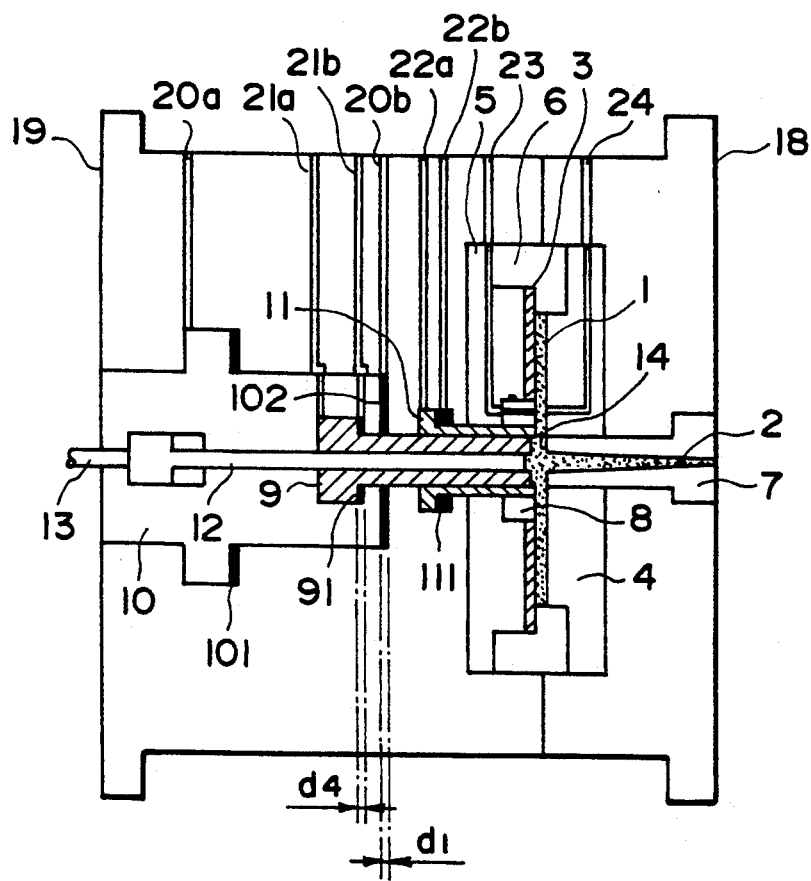

Further, when an injection molding apparatus as shown in FIG. 15 is used, in order to release the product 1 from the stamper 3 without actuating the ejector ring 11, it is possible to eject a release fluid from the movable half and simultaneously move the gate cutter 9 with the second stage stroke. The pressure of the release fluid may suitably be 1–9 Kg/cm$^2$, particularly 3.5–6.0 Kg/cm$^2$, so as to release the product 1 from the stamper. Then, the ejector ring 11 may be used to only release the linkage between the product and the gate cutter.

As described above, according to the present invention using an injection molding apparatus having a gate cutter inserted so as to be reciprocally movable at two stages of strokes, the gate cutter is moved at a first stage stroke to cut the gate of a resin product filling the cavity, then the mold is commenced to open and, simultaneously with the commencement of the mold opening, the gate cutter and an ejector ring are simultaneously moved in a direction to release the product from the stamper, so that the product separated from the cut gate part thereof and also the sprue part thereof are projected toward the fixed half to be separated from the stamper, thus preventing occurrence of flowing of a minute pattern on the surface of the product. Simultaneously with the mold opening, the gate cutter 9 is moved forward, so that the gate cutter can hold the product over the entire thickness of the product at its front edge even at the time of the release of the product from the stamper. As a result, the product is always held by the movable half to provide a constant positional relationship between the product and the hand of a removing mechanism.

Further, according to the invention, the product can be held apart with a large spacing from the stamper while retaining the product at the front end of the gate cutter, so that a product with little warp can be produced even when a high-pressure release fluid is supplied from the movable half at the time of the release.

Incidentally, the commencement of mold opening is regarded as the time when the product in the cavity is released from a compression force from the mold. Further, with respect to the various operations required to be performed "simultaneously with the mold opening", a time lag of, e.g., (commencement of mold opening) ±0.5 sec, possibly caused by a friction accompanying a mechanical movement or a length of passage for presurized fluid or release fluid, may be regarded as negligible, i.e., not violating the requirement of "simultaneous with commencement of mold opening".

In the above embodiment, the present invention has been explained with respect to injection molding of an optical disk substrate, but the present invention is not only effective for injection molding of an optical disk substrate but also effective in general for injection molding of a product, particularly a recording material, having a minute surface pattern and a central hole to be formed at an exact position.

What is claimed is:

1. A process for injection molding of a product having a minute surface pattern and a central hole, comprising the steps of:
   injecting a resin into a cavity defined by a mold including a movable half provided with a stamper having a minute surface pattern and a fixed half defining the cavity in combination with the movable half to form a product;
   providing the movable half with an ejector ring reciprocally movable at first and second stage strokes in a mold opening-and-closing direction, a gate cutter reciprocally movable at first and second stage strokes in the mold opening-and-closing direction, and an ejector pin carried within the gate cutter and reciprocally movable in the mold opening-and-closing direction;
   moving the gate cutter at the first stage stroke to form a central hole of the product in the cavity, and holding the product by a circumference of the gate cutter tip at its inner peripheral face of the central hole;
   opening the mold;
   substantially simultaneously with commencement of the mold opening, moving the ejector ring at the first stage stroke to release the product from the stamper and moving the gate cutter at the second stage stroke in a direction causing the release of the product from the stamper to retain the linkage between the gate cutter and the product; and
   after the mold is opened, moving the ejector ring to release the linkage between the gate cutter and the product and moving the ejector pin to release a sprue from the gate cutter.

2. A process according to claim 1, wherein a release fluid is emitted against the product through the movable half substantially simultaneously with the mold opening.

3. A process according to claim 2, wherein the release fluid has a pressure of 0.5–7 Kg/cm$^2$.

4. A process according to claim 2, wherein a release fluid is emitted against the product through the fixed half during a period from commencement of the mold opening until a termination of movement of the product relative to the movable half.

5. A process according to claim 1, wherein the release fluid has a pressure of 1–9 Kg/cm$^2$.

6. A process for injection molding of a disk substrate having a minute surface pattern and a central hole, comprising the steps of:
   injecting a resin into a cavity defined by a mold including a movable half provided with a stamper having a minute surface pattern and a fixed half defining the cavity in combination with the movable half to form a product;
   providing the movable half with an ejector ring reciprocally movable at first and second stage strokes in a mold opening-and-closing direction, a gate cutter reciprocally movable at first and second stage strokes in the mold opening-and-closing direction, and an ejector pin carried within the gate cutter and reciprocally movable in the mold opening-and-closing direction;
   moving the gate cutter at the first stage stroke to form a central hole of the product in the cavity and holding the product by a circumference of the gate cutter tip at its inner peripheral face of the central hole,
   opening the mold;
   substantially simultaneously with commencement of the mold opening, moving the ejector ring at the first stage stroke to release the product from the stamper and moving the gate cutter at the second stage stroke in a direction causing the release of the product from the stamper to retain the linkage between the gate cutter and the product, and
   after the mold is opened, moving the ejector ring to release a linkage between the gate cutter and the product and moving the ejector pin to release a sprue from the gate cutter.

7. A process for injection molding of a product having a minute surface pattern and a central hole, comprising the steps of:
   injecting a resin into a cavity defined by a mold including a movable half provided with a stamper having a minute surface pattern and a fixed half defining the cavity in combination with the movable half to form a product;
   providing the movable half with an ejector ring reciprocally movable at first and second stage strokes in the mold opening-and-closing direction and a gate cutter reciprocally movable at first and second stage strokes in the mold opening-and closing direction;
   moving the gate cutter at the first stage stroke to form a central hole of the product in the cavity, and holding the product by a circumference of the gate cutter tip at its inner peripheral face of the central hole,
   opening the mold;
   substantially simultaneously with commencement of the mold opening, moving the ejector ring at the first stage stroke to release the product from the stamper and moving the gate cutter at the second stage stroke in a direction causing the release of the product from the stamper to retain the linkage between the gate cutter and the product, and
   after the mold is opened, moving the ejector ring at a second stage stroke to release the linkage between the gate cutter and the product.

8. A process according to claim 7, wherein a release fluid is emitted against the product through the movable half substantially simultaneously with the mold opening.

9. A process according to claim 8, wherein the release fluid has a pressure of 0.5-7 Kg/cm$^2$.

10. A process according to claim 8, wherein a release fluid is emitted against the product through the fixed half during a period from commencement of the mold opening until termination of movement of the product relative to the movable half.

11. A process for injection molding of a disk substrate having a minute surface pattern and a central hole, comprising the steps of:
  injecting a resin into a cavity defined by a mold including a movable half provided with a stamper having a minute surface pattern and a fixed half defining the cavity in combination with the movable half to form a product;
  providing the movable half with an ejector ring reciprocally movable at first and second stage strokes in the mold opening-and-closing direction and a gate cutter reciprocally movable at first and second stage strokes in the mold opening-and-closing direction;
  moving the gate cutter at the first stage stroke to form a central hole of the product in the cavity, and holding the product by a circumference of the gate cutter tip at its peripheral face of the central hole;
  opening the mold;
  substantially simultaneously with commencement of the mold opening, moving the ejector ring at the first stage stroke to release the product from the stamper and moving the gate cutter at the second stage stroke in a direction causing the release of the product from the stamper to retain the linkage between the gate cutter and the product; and
  after the mold is opened, moving the ejector ring at the second stage stroke to release the linkage between the gate cutter and the product.

12. A process for injection molding of a product having a minute surface pattern and a central hole, comprising the steps of:
  injecting a resin into a cavity defined by a mold including a movable half provided with a stamper having a minute surface pattern and a fixed half defining the cavity in combination with the movable half to form a product;
  providing the movable half with an ejector ring reciprocally movable in a mold opening-and-closing direction, a gate cutter reciprocally movable at first and second stage strokes in the mold opening-and-closing direction, the movable half further including an outer periphery ring for affixing an outer periphery of the stamper to the movable half, the outer periphery ring having an inner surface defining a part of the cavity and having a tapered portion providing a diameter which gradually increases as it goes away from the stamper face, the fixed half being fitted against the outer periphery ring so as to define the cavity,
  moving the gate cutter at the first stage stroke to form a central hole of the product in the cavity;
  opening the mold; and
  substantially simultaneously with commencement of the mold opening, releasing the product from the stamper and moving the gate cutter at the second stage stroke in a direction causing the release of the product from the stamper, wherein
  the second stage stroke of the gate cutter has a length $d_4$ sufficient to provide a spacing of at least 50 microns as a minimum distance between a data transfer face of the product and a face of the stamper, and
  the second stage stroke $d_4$ of the gate cutter is set to a value in the range of $D+X+(50/\sin \theta)$ to $D+X+(300/\sin \theta)$, wherein D denotes the thickness of the cavity, X denotes the length over which the fixed half covers the inner face of the outer periphery ring at the time the mold is closed, and $\theta$ denotes the angle of taper of the outer periphery ring.

13. A process according to claim 12, wherein the ejector ring is also moved in the direction causing the release of the product from the stamper substantially simultaneously with commencement of the mold opening.

14. A process according to claim 13, wherein a release fluid is emitted against the product through the movable half substantially simultaneously with the mold opening.

15. A process according to claim 14, wherein the release fluid has a pressure of 0.5-7 Kg/cm$^2$.

16. A process according to claim 14, wherein a release fluid is emitted against the product through the fixed half during a period from commencement of the mold opening until termination of movement of the product relative to the movable half.

17. A process according to claim 12, wherein the ejector ring is reciprocally movable at first and second stage strokes in the mold opening-and-closing direction, and the gate cutter is moved at the second stage stroke and the ejector ring is moved at the first stage stroke, respectively, in the direction causing the release of the product from the stamper substantially simultaneously with commencement of the mold opening.

18. A process according to claim 12, wherein a release fluid is emitted against the product through the movable half substantially simultaneously with the mold opening.

19. A process according to claim 18, wherein the release fluid has a pressure of 1-9 Kg/cm$^2$.

20. A process for injection molding of a product having a minute surface pattern and a central hole, comprising the steps of:
  injecting a resin into a cavity defined by a mold including a movable half provided with a stamper having a minute surface pattern and a fixed half defining the cavity in combination with the movable half to form a product;
  providing the movable half with an ejector ring reciprocally movable in a mold opening-and-closing direction, a gate cutter reciprocally movable at first and second stage strokes in the mold opening-and-closing direction, and an ejector pin carried within the gate cutter reciprocally movable in the mold opening-and-closing direction, the movable half further includes an outer periphery ring for affixing an outer periphery of the stamper to the movable half, the outer periphery ring having an inner surface defining a part of the cavity and having a tapered portion providing a diameter which gradually increases as it goes away from the stamper face, the fixed half being fitted against the outer periphery ring so as to define the cavity,
  moving the gate cutter at the first stage stroke to form a central hole of the product in the cavity, and holding the product by a circumference of the gate cutter tip at its inner peripheral face of the central hole, opening the mold;

substantially simultaneously with commencement of the mold opening, releasing the product from the stamper and moving the gate cutter at the second stage stroke in a direction causing the release of the product from the stamper, wherein the second stage stroke of the gate cutter has a length $d_4$, and the second stage stroke $d_4$ is set to a value in the range of $D+X+(50 \mu m/\sin \theta)$ to $D+X+(300 \mu m/\sin \theta)$, wherein D denotes the thickness of the cavity, X denotes the length over which the fixed half covers the inner face of the outer periphery ring at the time the mold is closed, and $\theta$ denotes the angle of taper of the outer periphery ring, and after the mold is opened, moving the ejector ring to release a linkage between the gate cutter and the product, and moving the ejector pin to release a sprue from the gate cutter.

21. A process according to claim 20, wherein the second stage stroke of said gate cutter has a length $d_4$ sufficient to provide a spacing of at least 50 microns as a minimum distance between a data transfer face of the product and said stamper face.

22. A process according to claim 12 or 20, wherein said product is a disk substrate.

23. A process for injection molding of a product having a minute surface pattern and a central hole, comprising the steps of:

injecting a resin into a cavity defined by a mold including a movable half provided with a stamper having a minute surface pattern and a fixed half defining the cavity in combination with the movable half to form a product;

providing the movable half with an ejector ring reciprocally movable in a mold opening-and-closing direction, a gate cutter reciprocally movable at first and second stage strokes in the mold opening-and-closing direction, the movable half further includes an outer periphery ring for affixing an outer periphery of the stamper to the movable half, the outer periphery ring having an inner surface defining a part of the cavity and having a tapered portion providing a diameter which gradually increases as it goes away from the stamper face, the fixed half being fitted against the outer periphery ring so as to define the cavity;

moving the gate cutter at the first stage stroke to form a central hole of the product in the cavity;

opening the mold; and substantially simultaneously with commencement of the mold opening, releasing the product from the stamper and moving the gate cutter at the second stage stroke in a direction causing the release of the product from the stamper, wherein the second stage stroke of the gate cutter has a length $d_4$, and the second stage stroke $d_4$ is set to a value in the range of $(D+X+(50 \mu m/\sin \theta)$ to $(D+X+(300 \mu m/\sin \theta)$, wherein D denotes the thickness of the cavity, X denotes the length over which the fixed half covers the inner face of the outer periphery ring at the time the mold is closed, and $\theta$ denotes the angle of taper of the outer periphery ring.

24. An apparatus for injection molding of a product having a minute surface pattern and a central hole, comprising:

a mold including a movable half provided with a stamper having a minute surface pattern and a fixed half forming a cavity to be filled with a resin in combination with said movable half, wherein said movable half is provided with an ejector ring reciprocally movable at first and second stage strokes in a mold opening-and-closing direction, a gate cutter reciprocally movable at first and second stage strokes in the mold opening-and-closing direction, and an ejector pin carried within said gate cutter and reciprocally movable in the mold opening-and-closing direction to eject a sprue from said gate cutter, and said movable half is further provided with means for causing the first stage stroke of said ejector ring to release the product from said stamper substantially simultaneously with commencement of the mold opening, and means for causing the second stage stroke of said gate cutter in the direction causing the release of the product from said stamper substantially simultaneously with commencement of the mold opening.

25. An apparatus according to claim 24, wherein said gate cutter is provided with an undercut portion at a circumference of its front end.

26. An apparatus according to claim 24, wherein at least one of said movable half and said fixed half is provided with an emission port for a release fluid acting on the product.

27. An apparatus according to claim 24, which further includes means for emitting a release fluid to the product through said movable half substantially simultaneously with commencement of the mold opening.

28. An apparatus according to claim 24, wherein the first stage stroke of said ejector ring is equal to or smaller than the second stage stroke of said gate cutter.

29. An apparatus according to claim 24, wherein the second stage stroke of said gate cutter has a length $d_4$ of 50 microns to 4 mm.

30. An apparatus according to claim 24, which further includes an outer periphery ring for affixing an outer periphery of said stamper to the said movable half, said outer periphery ring having an inner surface defining a part of the cavity and having a tapered portion providing a diameter which gradually increases as it goes away from a face of said stamper, said fixed half being fitted against said outer periphery ring so as to define the cavity.

31. An apparatus according to claim 30, wherein the second stage stroke of said gate cutter has a length $d_4$ sufficient to provide a spacing of at least 50 microns as a minimum distance between a data transfer face of the product and said stamper face.

32. An apparatus according to claim 31, wherein the second stage stroke $d_4$ of said gate cutter is set to a value in the range of $D+X+(50/\sin \theta)$ to $D+X+(300/\sin \theta)$, wherein D denotes the thickness of the cavity, X denotes the length over which the fixed half covers the inner face of the said outer periphery ring at the time the mold is closed, and $\theta$ denotes the angle of taper of said outer periphery ring.

33. An apparatus for injection molding of a disk substrate having a minute surface pattern and a central hole, comprising:

a mold including a movable half provided with a stamper having a minute surface pattern and a fixed half forming a cavity to be filled with a resin in combination with said movable half, wherein said movable half is provided with an ejector ring reciprocally movable at first and second stage strokes in a mold opening-and-closing direction, a gate cutter reciprocally movable at first and second stage strokes in the mold opening-and-closing direction, and an ejector pin carried within said gate cutter and reciprocally movable in the mold opening-and-closing direction to release a sprue from said gate cutter, and said movable half is further provided with means for causing the first stage stroke of said ejector ring to release the product from said stamper substantially simultaneously with commencement of the mold opening, and means for causing the second stage stroke of said gate cutter in the direction causing the release of the product from said stamper substantially simultaneously with commencement of the mold opening.

34. An apparatus for injection molding of a product having a minute surface pattern and a central hole, comprising:

a mold including a movable half provided with a stamper having a minute surface pattern and a fixed half forming a cavity to be filled with a resin in combination with said movable half, wherein said movable half is provided with an ejector ring reciprocally movable at first and second stage strokes in a mold opening-and-closing direction and a gate cutter reciprocally movable at first and second stage strokes in the mold opening-and-closing direction, and said movable half is further provided with means for causing the first stage stroke of said ejector ring to release the product from said stamper substantially simultaneously with commencement of the mold opening and means for causing the second stage stroke of said gate cutter in a direction causing the release of the product from said stamper substantially simultaneously with the mold opening.

35. An apparatus according to claim 34, wherein said gate cutter is provided with an undercut portion at a circumference of its front end.

36. An apparatus according to claim 34, wherein at least one of said movable half and said fixed half is provided with an emission port for a release fluid acting on the product.

37. An apparatus according to claim 34, which further includes means for emitting a release fluid to the

38. An apparatus according to claim 34, wherein the second stage stroke of said gate cutter has a length $d_4$ of 50 microns to 4 mm.

39. An apparatus according to claim 34, which further includes an outer periphery ring for affixing an outer periphery of said stamper to said movable half, said outer periphery ring having an inner surface defining a part of the cavity and having a tapered portion providing a diameter which gradually increases as it goes away from a face of said stamper, said fixed half being fitted against said outer periphery ring so as to define the cavity.

40. An apparatus according to claim 39, wherein the second stage stroke $d_4$ of said gate cutter is set to a value in the range of $D+X+(50/\sin \theta)$ to $D+X+(300/\sin \theta)$, wherein D denotes the thickness of the cavity, X denotes the length over which said fixed half covers an inner face of said outer periphery ring at the time the mold is closed, and $\theta$ denotes the angle of taper of said outer periphery ring.

41. An apparatus for injection molding of a product having a minute surface pattern and a central hole, comprising:

a mold including a movable half provided with a stamper having a minute surface pattern and a fixed half forming a cavity to be filled with a resin in combination with said movable half, wherein said movable half is provided with an ejector ring reciprocally movable in first and second stage strokes in a mold opening-and-closing direction and a gate cutter reciprocally movable at first and second stage strokes in the mold opening-and-closing direction, and said movable half is further provided with means for causing the first stage stroke of said ejector ring to release the product from said stamper substantially simultaneously with commencement of the mold opening and means for causing a second stage stroke of said gate cutter in a direction causing the release of the product from said stamper substantially simultaneously with the mold opening, and the first stage stroke of said ejector ring is equal to or smaller than the second stage stroke of said gate cutter.

42. An apparatus for injection molding of a product having a minute surface pattern and a central hole, comprising:

a mold including a movable half provided with a stamper having a minute surface pattern and a fixed half forming a cavity to be filled with a resin in combination with said movable half, wherein said movable half is provided with an ejector ring reciprocally movable in a mold opening-and-closing direction and a gate cutter reciprocally movable at first and second stage strokes in the mold opening-and-closing direction, and said movable half further includes an outer periphery ring for affixing an outer periphery of said stamper to said movable half, said outer periphery ring having an inner surface defining a part of the cavity and having a tapered portion providing a diameter which gradually increases as it goes away from a face of said stamper, said fixed half being fitted against said outer periphery ring so as to define the cavity, the second stage stroke of said gate cutter having a length $d_4$ sufficient to provide a spacing of at least 50 microns as a minimum distance between a data transfer face of the product and said stamper face, and the second stage stroke $d_4$ of said gate cutter being set to a value in the range of $D+X+(50/\sin \theta)$ to $D+X+(300/\sin \theta)$ wherein D denotes the thickness of the cavity, X denotes the length over which said fixed half covers said inner face of said outer periphery ring when the mold is closed, and $\theta$ denote the angle of taper of said outer periphery ring.

43. An apparatus according to claim 42, wherein said gate cutter is provided with an undercut portion at a circumference of its front end.

44. An apparatus according to claim 42, wherein at least one of said movable half and said fixed half is provided with an emission port for a release fluid acting on the product.

45. An apparatus according to claim 42, wherein said movable half is further provided with means for releasing the product from said stamper substantially simultaneously with commencement of the mold opening and means for causing a second stage stroke of said gate cutter in a direction causing the release of the product from said stamper substantially simultaneously with the mold opening.

46. An apparatus according to claim 45, wherein said ejector ring is moved and the second stage stroke of said gate cutter is effected in the direction causing the release of the product from said stamper substantially simultaneously with commencement of the mold opening.

47. An apparatus according to claim 46, which further includes means for emitting a release fluid to the product through said movable half substantially simultaneously with commencement of the mold opening.

48. An apparatus according to claim 46, wherein said ejector ring is reciprocally movable at first and second stage strokes in the mold opening-and-closing direction and the first stage stroke thereof is effected simultaneously with commencement of the mold opening.

49. An apparatus according to claim 48, wherein the first stage stroke of said ejector ring is equal to or smaller than the second stage stroke of said gate cutter.

50. An apparatus according to claim 48, wherein a second stage stroke of said ejector ring is caused to release a linkage between said gate cutter and the product.

51. An apparatus according to claim 45, which further includes means for emitting a release fluid to the product through said movable half substantially simultaneously with commencement of the mold opening.

52. An apparatus according to claim 42, wherein the second stage stroke of said gate cutter has a length $d_4$ of 50 microns to 4 mm.

53. An apparatus for injection molding of a disk substrate having a minute surface pattern and a central hole, comprising:
a mold including a movable half provided with a stamper having a minute surface pattern and a fixed half forming a cavity to be filled with a resin in combination with said movable half, wherein
said movable half is provided with an ejector ring reciprocally movable at first and second stage strokes in a mold opening-and-closing direction and a gate cutter reciprocally movable at first and second stage strokes in the mold opening-and-closing direction, and
said movable half is further provided with means for causing the first stage stroke of said ejector ring to release the product from said stamper substantially simultaneously with commencement of the mold opening, and means for causing the second stage stroke of said gate cutter in the direction causing the release of the product from said stamper substantially simultaneously with commencement of the mold opening.

54. An apparatus according to claim 53, wherein the first stage stroke of said ejector ring is equal to or smaller than the second stage stroke of said gate cutter.

55. An apparatus for injection molding of a product having a minute surface pattern and a central hole, comprising:
a mold including a movable half provided with a stamper having a minute surface pattern and a fixed half forming a cavity to be filled with a resin in combination with said movable half, wherein
said movable half is provided with an ejector ring reciprocally movable in a mold opening-and-closing direction, a gate cutter reciprocally movable at first and second stage stroke sin the mold opening-and-closing direction, and an ejector pin carried within said gate cutter and reciprocally movable in the mold opening-and-closing direction to eject a sprue from said gate cutter, and
said movable half further includes an outer periphery ring for affixing an outer periphery of said stamper to said movable half, said outer periphery ring having an inner surface defining a part of the cavity and having a tapered portion providing a diameter which gradually increases as it goes away from a face of said stamper, said fixed half being fitted against said outer periphery ring so as to define the cavity,
the second stage stroke of said gate cutter having a length $d_4$, and
the second stage stroke $d_4$ being set to a value in the range of $D+X+(50 \ \mu m/\sin \theta)$ to $D+X+(300 \ \mu m/\sin \theta)$, wherein D denotes the thickness of the cavity, X denotes the length over which said fixed half covers said inner face of said outer periphery ring when the mold is closed, and $\theta$ denotes the angle of taper of said outer periphery ring.

56. An apparatus according to claim 55, wherein the second stage stroke of said gate cutter has a length $d_4$ sufficient to provide spacing of at least 50 microns as a minimum distance between a data transfer face of the product and said stamper face.

57. An apparatus according to claim 42 or 55, wherein said product is a disk substrate.

58. An apparatus for injection molding of a product having a minute surface pattern and a central hole, comprising:
a mold including a movable half provided with a stamper having a minute surface pattern and a fixed half forming a cavity to be filled with a resin in combination with said movable half, wherein
said movable half is provided with an ejector ring reciprocally movable in a mold opening-and-closing direction and a gate cutter reciprocally movable at first and second stage strokes in the mold opening-and-closing direction, and
said movable half further includes an outer periphery ring for affixing an outer periphery of said stamper to said movable half, said outer periphery ring having an inner surface defining a part of the cavity and having a tapered portion providing a diameter which gradually increases as it goes away from a face of said stamper, said fixed half being fitted against said outer periphery ring so as to define the cavity,
the second stage stroke of said gate cutter having a length $d_4$, and
the second stage stroke $d_4$ of said gate cutter being set to a value in the range of $D+X+(50 \ \mu m/\sin \theta)$ to $D+X+(300 \ \mu m/\sin \theta)$, wherein D denotes the thickness of the cavity, X denotes the length over which said fixed half covers said inner face of said outer periphery ring when the mold is closed, and ∂4 denote the angle of taper of said outer periphery ring.

* * * * *

UNITED STATES PATENT AND TRADEMARK OFFICE
CERTIFICATE OF CORRECTION

PATENT NO. : 5,330,693
DATED : July 19, 1994
INVENTOR(S) : Takada

Page 1 of 2

It is certified that error appears in the above-indentified patent and that said Letters Patent is hereby corrected as shown below: On the title page: Item

[56] REFERENCES CITED:

FOREIGN PATENT DOCUMENTS, "1264816   10/1989   Japan" should read --1-264816   10/1989   Japan-- and "2243317   9/1990   Japan" should read --2-243317   9/1990   Japan--.

[30] FOREIGN APPLICATION PRIORITY DATA:

"Sep. 18, 1990   [JP]   Japan ................. 246270" should read --Sep. 18, 1990   [JP]   Japan ........... 2-246270--.

[57] ABSTRACT:

Line 3, "molding, wherein" should read --molding apparatus and process, wherein--.

COLUMN 4:

Line 34, "outer peripheral ring 10." should read --outer peripheral ring 6.--.
Line 35, "drive ram 6" should read --drive ram 10--.

COLUMN 5:

Line 8, "ring 9" should read --ring 11--.

COLUMN 6:

Line 5, "ring 11" should read --ejector ring 11--.

COLUMN 8:

Line 6, "2degrees-3 degrees." should read

UNITED STATES PATENT AND TRADEMARK OFFICE
CERTIFICATE OF CORRECTION

PATENT NO. : 5,330,693
DATED : July 19, 1994
INVENTOR(S) : Takada

It is certified that error appears in the above-indentified patent and that said Letters Patent is hereby corrected as shown below:

--2 degrees - 3 degrees.--.

COLUMN 9:

Line 65, "a" should be deleted.

COLUMN 13:

Line 58, "(D" should read --D-- (both occurrences).

COLUMN 15:

Line 47, "to the" should read --to the product through said movable half substantially simultaneously with commencement of the mold opening.--.

COLUMN 18:

Line 6, "stroke sin" should read --strokes in--.
Line 65, "∂4 denote" should read --θ denotes--.

Signed and Sealed this

Twentieth Day of December, 1994

Attest:

BRUCE LEHMAN

Attesting Officer     Commissioner of Patents and Trademarks